US012493113B2

(12) United States Patent
Choi

(10) Patent No.: US 12,493,113 B2
(45) Date of Patent: Dec. 9, 2025

(54) RADAR DATA PROCESSING DEVICE AND LOCAL RANGE RESOLVING POWER ADJUSTING METHOD

(71) Applicant: SAMSUNG ELECTRONICS CO., LTD., Suwon-si (KR)

(72) Inventor: Sungdo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 836 days.

(21) Appl. No.: 16/843,129

(22) Filed: Apr. 8, 2020

(65) Prior Publication Data

US 2020/0408892 A1 Dec. 31, 2020

(30) Foreign Application Priority Data

Jun. 27, 2019 (KR) .................. 10-2019-0076965

(51) Int. Cl.
*G01S 13/42* (2006.01)
*G01S 7/10* (2006.01)
(Continued)

(52) U.S. Cl.
CPC .............. *G01S 13/426* (2013.01); *G01S 7/10* (2013.01); *G01S 13/584* (2013.01);
(Continued)

(58) Field of Classification Search
CPC ........ G01S 13/426; G01S 7/10; G01S 13/584; G01S 13/931; G01S 2013/9318;
(Continued)

(56) References Cited

U.S. PATENT DOCUMENTS 9,041,596 B2  5/2015 Kuwahara et al.
9,234,956 B2  1/2016 Kishigami et al.
(Continued)

FOREIGN PATENT DOCUMENTS

JP    2005-214884 A    8/2005
JP       5496066 B2    5/2014
(Continued)

OTHER PUBLICATIONS

Extended European Search Report issued on Oct. 20, 2020 in counterpart European Patent Application No. 20172092.7 (7 pages in English).

(Continued)

*Primary Examiner* — Vladimir Magloire
*Assistant Examiner* — Yonghong Li
(74) *Attorney, Agent, or Firm* — NSIP Law

(57) ABSTRACT

A radar data processing device and method is provided. The method generates a radar image map, predicts a region of interest (ROI) based on the generated radar image map, senses radar data with a radar sensor, identifies the sensed radar data based on steering information, adjusts the steering information based on the predicted ROI, and determines direction-of-arrival (DoA) information corresponding to the sensed radar data based on the adjusted steering information. The radar data processing device may locally adjust at least one of a range resolving power, an angular resolving power, or a Doppler velocity resolving power based on the ROI predicted based on a radar image map, and generate an accurate radar data processing result of a major region.

22 Claims, 13 Drawing Sheets

(51) Int. Cl.
*G01S 13/58* (2006.01)
*G01S 13/931* (2020.01)
*G05D 1/00* (2024.01)

(52) U.S. Cl.
CPC ..... *G01S 13/931* (2013.01); *G01S 2013/9318* (2020.01); *G01S 2013/9319* (2020.01); *G05D 1/0223* (2013.01); *G05D 1/0257* (2013.01)

(58) Field of Classification Search
CPC .. G01S 2013/9319; G01S 7/411; G01S 13/42; G01S 13/583; G01S 13/72; G01S 13/89; G01S 3/14; G01S 2013/932; G05D 1/0223; G05D 1/0257
See application file for complete search history.

(56) References Cited

U.S. PATENT DOCUMENTS

| | | | |
|---|---|---|---|
| 9,599,702 | B1 | 3/2017 | Bordes et al. |
| 9,846,228 | B2 * | 12/2017 | Davis ..................... G01S 13/87 |
| 10,149,048 | B1 | 12/2018 | Stefanakis et al. |
| 2005/0259006 | A1 | 11/2005 | Kim et al. |
| 2010/0066586 | A1 | 3/2010 | Liu et al. |
| 2011/0199263 | A1 * | 8/2011 | Kang ....................... G01S 3/04 |
| | | | 342/442 |
| 2014/0062763 | A1 | 3/2014 | Kishigami et al. |
| 2015/0362580 | A1 | 12/2015 | Ha et al. |
| 2016/0131753 | A1 * | 5/2016 | Brown .................. G01S 13/931 |
| | | | 342/128 |
| 2016/0291134 | A1 | 10/2016 | Droz et al. |
| 2018/0146186 | A1 | 5/2018 | Akkaya et al. |
| 2020/0072957 | A1 | 3/2020 | Choi |

FOREIGN PATENT DOCUMENTS

| | | |
|---|---|---|
| JP | 6293073 B2 | 3/2018 |
| KR | 10-2013-0081626 A | 7/2013 |
| KR | 10-1796472 B1 | 12/2017 |
| WO | WO 2018/140480 A1 | 8/2018 |

OTHER PUBLICATIONS

Chinese Office Action Issued on Mar. 1, 2025, in Counterpart Chinese Patent Application No. 202010300330.8 (13 Pages in English, 13 Pages in Chinese).

* cited by examiner

RADAR DATA PROCESSING DEVICE AND LOCAL RANGE RESOLVING POWER ADJUSTING METHOD

CROSS-REFERENCE TO RELATED APPLICATIONS

This application claims the benefit under 35 USC § 119(a) of Korean Patent Application No. 10-2019-0076965 filed on Jun. 27, 2019, in the Korean Intellectual Property Office, the entire disclosure of which is incorporated herein by reference for all purposes.

BACKGROUND

1. Field

The following description relates to technology for processing radar data and a local power adjusting method.

2. Description of Related Art

An advanced driver assistance system (ADAS) is a driver assistance system that enhances safety and convenience for a driver using sensors provided inside or outside a vehicle, and assist the driver in avoiding or preventing dangerous situations.

The sensors used in the ADAS include, for example, a camera, an infrared sensor, an ultrasonic sensor, a light detection and ranging (LIDAR), and a radio detection and ranging (RADAR). The radar may reliably measure objects around a vehicle without being affected by a surrounding environment including, for example, weather, compared to an optical sensor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a radar data processing method includes generating a radar image map; predicting a region of interest (ROI) based on the generated radar image map; adjusting steering information based on the predicted ROI; sensing radar data with a radar sensor; and determining direction-of-arrival (DoA) information corresponding to the sensed radar data based on the adjusted steering information.

The adjusting of the steering information may include allocating a preset number of candidate steering vectors included in the steering information to each of one or more target ranges based on the ROI.

The allocating of the candidate steering vectors to each of the one or more target ranges based on the ROI may include arranging candidate steering vectors in the ROI intensively by adjusting a distribution of the candidate steering vectors for each of the one or more target ranges in the steering information.

The allocating of the candidate steering vectors to each of the one or more target ranges based on the ROI may include increasing the number of candidate steering vectors associated with the ROI in the steering information; and decreasing the number of candidate steering vectors associated with a remaining region excluding the ROI in the steering information.

The adjusting of the steering information may include selecting a plurality of target ranges to be subject to calculation of the DoA information within a maximum sensing range of the radar sensor based on the ROI; and allocating a preset number of candidate steering vectors to each of the selected target ranges in the steering information based on the ROI.

The selecting of the plurality of target ranges based on the ROI may include arranging candidate steering vectors in the ROI intensively by adjusting a distribution of the plurality of target ranges.

The selecting of the plurality of target ranges based on the ROI may include increasing the number of target ranges to be subject to the calculation of the DoA information for an area corresponding to the ROI in the steering information; and decreasing the number of target ranges to be subject to the calculation of the DoA information for an area corresponding to a remaining region excluding the ROI in the steering information.

The determining of the DoA information may include retrieving, from the steering information, a target steering vector which matches the sensed radar data among candidate steering vectors for each of target ranges within a maximum sensing range of the radar sensor; and determining a steering angle mapped to the retrieved target steering vector to be the DoA information corresponding to the radar data.

The adjusting of the steering information may include when a new potential object is detected in a range in which an object is not detected in a previous frame, allocating a candidate steering vector to the range in which the new potential object is detected with a basic angular resolving power in the steering information.

The determining of the DoA information may further include skipping determining DoA information for a target range in which an object is not detected in a current frame among target ranges to be subject to DoA calculation in the adjusted steering information.

The radar data processing method may further include calculating Doppler velocity information based on the DoA information.

The calculating of the Doppler velocity information may include adjusting a local resolving power of the Doppler velocity information based on the predicted ROI.

The predicting of the ROI may include calculating DoA information corresponding to a previous frame from radar data collected from the previous frame, generating coordinate information of a nearby object corresponding to the previous frame based on the DoA information corresponding to the previous frame and ego-localization of a radar data processing device; and predicting an ROI of a current frame based on a radar image map subsequent to the previous frame generated from the coordinate information corresponding to the previous frame.

The method may include generating, as a radar image map of a current frame, a map that indicates at least one of an object occupancy probability and a radar signal reception intensity of nearby points around a radar data processing device from DoA information of the current frame.

The method may further include visualizing the radar image map through a display.

The method may include changing, based on the radar image map, at least one of a speed, an acceleration, and a steering operation of a vehicle in which the radar data processing device is mounted.

The adjusting of the steering information may include when an object is not detected in a radar image map of a previous frame, selecting target ranges from the steering information with a basic resolving power and arranging candidate steering vectors in the selected target ranges.

The radar sensor may include a field of view (FOV) that includes a different direction from a longitudinal direction of a vehicle.

In another general aspect, a radar data processing method includes generating a radar image map; predicting a region of interest (ROI) based on the generated radar image map; adjusting a local range resolving power of radar data based on the predicted ROI; and detecting a range to a target point from which the radar data is reflected based on the adjusted local range resolving power.

The adjusting of the local range resolving power may include decreasing a range resolving power for the ROI within a maximum sensing range of the radar sensor; and increasing a range resolving power for a remaining region excluding the ROI.

The detecting of the range may include when radar data is reflected from a target point corresponding to the ROI, detecting a range to the target point by a unit of the decreased range resolving power; and when radar data is reflected from a target point corresponding to the remaining region, detecting a range to the target point by a unit of the increased range resolving power.

The adjusting of the local range resolving power may include consistently maintaining an overall range resolving power in range detection.

In another general aspect, a radar data processing device includes a radar sensor configured to sense radar data; and a processor configured to: generate a radar image map; predict a region of interest (ROI) based on the generated radar image map; adjust the steering information which identifies the sensed radar data based on the predicted ROI, and determine direction-or-arrival (DoA) information corresponding to the radar data based on the adjusted steering information.

Other features and aspects will be apparent from the following detailed description, the drawings, and the claims.

Figure 1:
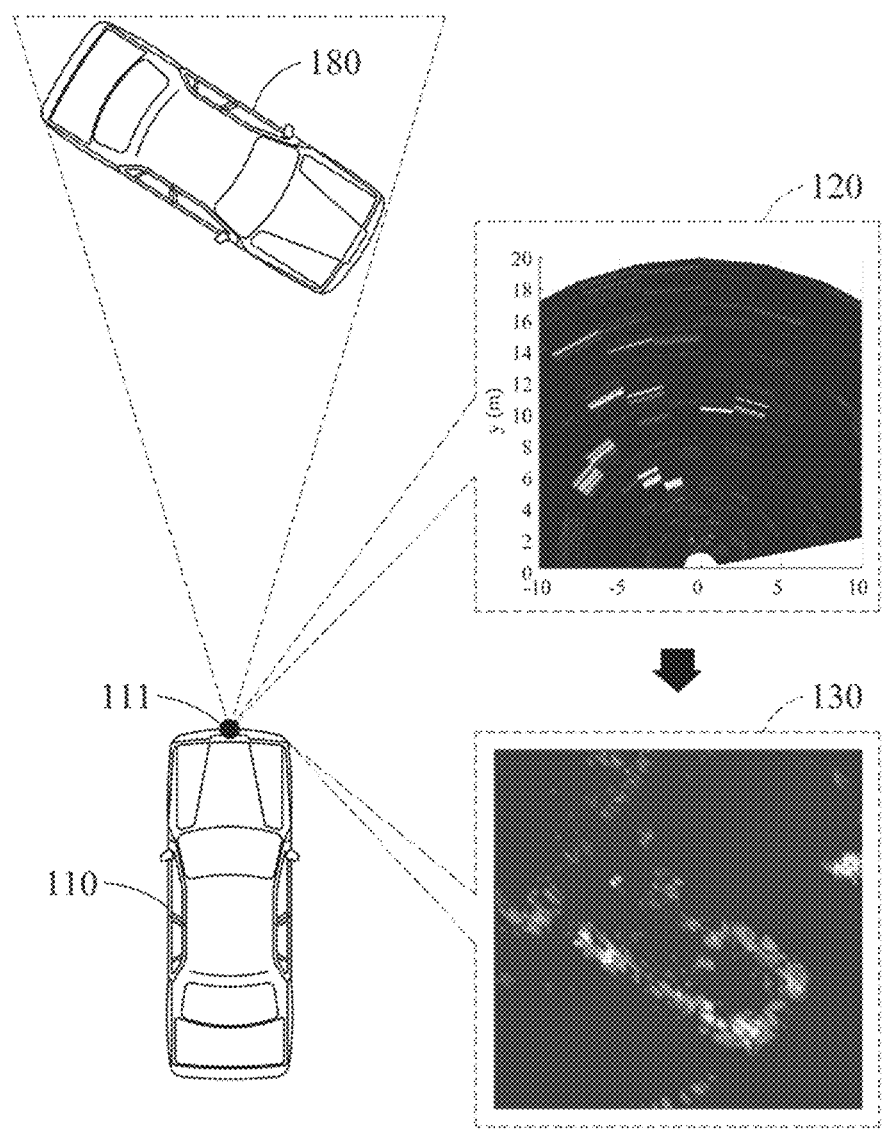
FIG. 1 is a diagram illustrating an example of recognizing a surrounding environment through a radar data processing method, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Various modifications may be made to the following examples. Here, the examples are not construed as limited to the disclosure and should be understood to include all changes, equivalents, and replacements within the idea and the technical scope of the disclosure.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

An advanced driver assistance system (ADAS) is a cutting-edge driver assistance system that assists a driver in driving to enhance safety and convenience for the driver using sensors provided inside or outside a vehicle, and thus assists the driver in avoiding or preventing a dangerous situation. The radar system market is rapidly growing due to tightened regulations pertaining to safe driving by government authorities in advanced countries, and an influence of efforts to commercialize autonomous vehicles made by automobile makers and information and technology (IT) companies. The sensors applicable to the ADAS may include, for example, a camera, a mmWave radar, an infrared sensor, an ultrasonic sensor, a light detection and ranging (LIDAR), and similar sensors. These types of sensors may differ from each other based on a range to be detected and a function to be applied, and recently there is a desire for sensor fusion technology for combining the sensors to compensate for disadvantages of the sensors. Hereinafter, technology using a radar sensor among the sensors will be described.

FIG. 1 is a diagram illustrating an example of recognizing a surrounding environment through a radar data processing method.

A radar data processing device 110 may detect an object present in front of the radar processing device 110 through a sensor 111. The sensor 111, which may be configured to detect an object, may be, for example, an image sensor and a radar sensor, and may detect a range to an object present in front of the radar processing device 110. The term "range" used herein may indicate a distance, for example, a range from A to B may indicate a distance from A to B, and a range between A and B may indicate a distance between A and B, and thus the terms "range" and "distance" may be interchangeably used herein.

The use of the term "may" herein with respect to an example or embodiment, e.g., as to what an example or embodiment may include or implement, means that at least one example or embodiment exists where such a feature is included or implemented while all examples and embodiments are not limited thereto.

FIG. 1 illustrates an example of the sensor being a radio detection and ranging (RADAR). In the example of FIG. 1, the radar data processing device 110 analyzes a radar signal received from a radar sensor 111 and detects a range to an object 180 present in front of the radar data processing device 110. The radar sensor 111 may be disposed inside or outside the radar data processing device 110. The radar data processing device 110 may detect the range to the object 180 present in front of the radar data processing device 110 based on data collected from another sensor, for example, an image sensor and the like, in addition to the radar signal received from the radar sensor 111. A resolving power in processing radar data may be classified into a resolving power in terms of hardware, and a resolving power in terms of software. Hereinafter, the resolving power in terms of software will be mainly described in relation to how performance of the resolving power may be improved.

In an example, the radar data processing device 110 may be provided in a vehicle. The vehicle may perform operations such as adaptive cruise control (ACC), autonomous emergency braking (AEB), and blind spot detection (BSD), based on a range to an object that is detected by the radar data processing device 110.

In addition, the radar data processing device 110 may generate a map 130 of an environment therearound in addition to detecting the range. The map 130 may indicate locations of targets present around the radar data processing device 110, and such nearby targets may include dynamic objects such as vehicles and human beings, or stationary or background objects such as guardrails and traffic lights.

To generate the map 130, single scanning may be used. Through the single scanning, the radar data processing device 110 obtains a single scan image 120 from the sensor 111, and generates the map 130 from the obtained single scan image 120. The single scan image 120 may be generated from a radar signal sensed by a single radar sensor 111, and indicates a relatively high resolving power. The single scan image 120 may be a radar scan image, and may include ranges indicated by radar signals received from an elevation angle by the radar sensor 111. For example, a horizontal axis of the single scan image 120 in the example of FIG. 1 indicates a steering angle of the radar sensor 111, and a vertical axis of the single scan image 120 indicates a range from the radar sensor 111 to a target. A format of a single scan image is not limited to the example illustrated in FIG. 1, and a single scan image may be represented by other formats based on various examples.

The steering angle used herein indicates an angle corresponding to a direction, for example, a direction of travel from a radar data processing device towards a target point. For example, the steering angle is an angle between a travelling direction of the radar data processing device, for example, a vehicle, and the target point, with respect to the radar data processing device. The steering angle is described herein based mainly on a horizontal angle, but not limited thereto. The steering angle may also be applied to an elevation angle.

The radar data processing device 110 may obtain accurate information about a shape of a target through a multi-radar map. The multi-radar map may be generated by combining a plurality of radar scan images. For example, the radar data processing device 110 generates the map 130 by spatiotemporally combining radar scan images obtained as the radar sensor 111 moves. The map 130 may be of a type of radar image map.

Herein, radar data may include raw radar data sensed by the radar sensor 111.

To generate the map 130, direction-of-arrival (DoA) information may be used. The DoA information may indicate a direction in which a radar signal reflected from a target point is received. The radar data processing device 110 may use the DoA information to identify a direction in which the target point is present with respect to the radar sensor 111. Thus, such DoA information may be used to generate radar scan data and a map of surrounding areas. To obtain DoA information of a fine resolving power by the radar data processing device 110, the radar data processing device 110 may need to receive a greater number of radar signals associated with angle and/or distance or range, and process phases. However, when the radar sensor 111 receives a greater number of signals and processes phases, an amount of computation or operation may increase, and a computation time may increase accordingly. Hereinafter, a method of obtaining DoA information of a desired resolving power with a relatively low operation load will be described.

Figure 2:
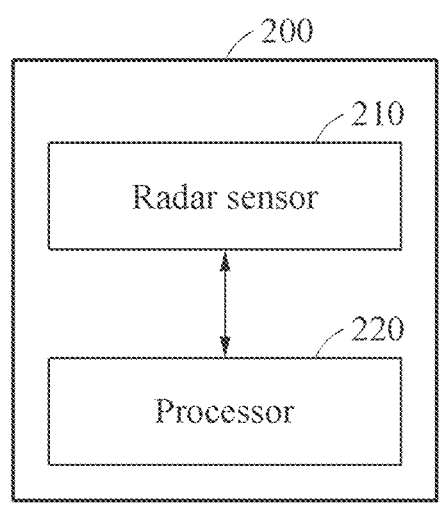
FIG. 2 is a diagram illustrating an example of a radar data processing device, in accordance with one or more embodiments.

FIG. 2 is a diagram illustrating an example of a radar data processing device.

Referring to FIG. 2, a radar data processing device 200 includes a radar sensor 210 and a processor 220.

In an example, the radar sensor 210 may sense radar data. For example, the radar sensor 210 may externally radiate a radar signal, and receives a signal of the radiated radar signal that is reflected from a target point. The radar sensor 210 may include antennas corresponding to receiving channels (Rx channels), and signals received through the Rx channels may have different phases based on the directions in which they are received. The radar sensor 210 will be described in detail with reference to FIG. 3.

The processor 220 may predict a region of interest (ROI) based on a previous radar image map generated from previous radar data. An ROI may be a region corresponding to a distance and an angle of an object in and at which an object or a background is predicted to be present. For example, the ROI may be indicated by an angle range and a distance range. For example, when an object is predicted to be present 30 meters (m) away at 30° rightwards with respect to a traveling direction of the radar data processing device 200, an ROI may be set to be an angle range of 28° to 32° and a distance range of 29 m to 31 m. However, the ROI is not limited to the example described in the foregoing, and may change based on various examples. For example, an ROI may be predicted based on a movement to a location in a current frame based on ego-localization in a previous frame based on ego-motion information of a device, for example, a vehicle, in which the radar data processing device 200 is provided or mounted. There is no special constraint in generating a radar image map, and thus the processor 220 may predict an ROI of a nearby stationary object or a nearby dynamic object.

The radar data sensed by the radar sensor 210 may be identified by steering information, and the processor 220 may adjust the steering information based on the predicted ROI. The steering information may be used to identify radar data, and may include steering vectors, an angular resolving power, a range resolving power, a Doppler velocity resolving power, and an arrangement of steering vectors based on each resolving power. The term "resolving power" used herein may indicate a capability of a device to identify a small difference, for example, a minimum scale unit operating range/full operating range. The resolving power may indicate a discrimination power of a minimum unit. The smaller a resolving power of the device, the more precise result the device may output. A region having a small value of resolving power may indicate a discrimination power of a smaller unit, and thus a resolution may be improved. Conversely, a region having a large value of resolving power may indicate a discrimination power of a greater unit, and thus a resolution may be degraded and reduced.

A steering vector included in the steering information may also be referred to as a candidate steering vector. When radar data is received at a certain angle, a steering vector may include phase information calculated as being included in the radar data. Here, when a vector including phase information of sensed radar data is referred to as a radar vector, a steering vector which is determined to match the radar vector among candidate steering vectors included in the steering information is referred to as a target steering vector. A set of steering vectors may be represented by Equation 1 below, and a steering vector may be represented by Equation 2 below.

$$A = [\alpha(\theta_1), \ldots, \alpha(\theta_K)] \qquad \text{Equation 1}$$

$$\alpha(\theta_i) = \left[1, e^{\frac{j2\pi d}{\lambda}\sin\theta_i}, \ldots, e^{\frac{j2\pi(N-1)d}{\lambda}\sin\theta_i}\right]^T \qquad \text{Equation 2}$$

In Equation 1, a steering vector set A may include K steering vectors, in which K denotes an integer greater than or equal to 1. In Equation 2, d denotes a distance between antennas of an antenna array included in a radar sensor. j denotes an imaginary unit, and λ denotes a wavelength. In addition, $\theta_i$ denotes an ith steering angle in a steering vector set, in which i denotes an integer greater than or equal to 1. $\alpha(\theta_i)$ denotes a steering vector corresponding to a steering angle $\theta_i$.

As the number K of steering vectors increases in Equation 1, an amount of time used to retrieve a steering vector matching a sensed radar signal may increase when determining a DoA. In an example, to minimize an increase in such processing time used to determine a DoA, the radar data processing device 200 may maintain the number K of steering vectors and locally adjust a distribution of steering angle $\theta_i$ for each distance and each angle. The radar data processing device 200 may effectively obtain a desirable resolving power using a same amount of calculation or computation through such a local adjustment of a resolving power. Adjusting steering information may indicate locally adjusting at least one of an angular resolving power, a range resolving power, or a Doppler velocity resolving power based on an ROI. Hereinafter, adjusting an angular resolving power, adjusting a range resolving power, and adjusting a Doppler velocity resolving power will be described with reference to FIGS. 9, 10, and 11, respectively.

For example, when the radar sensor 210 includes a plurality of Rx channels, phase information of radar data may indicate a phase difference between a reference phase and a phase of a signal received through each of the Rx channels. The reference phase may be an arbitrary phase, and may be set to be a phase of one of the Rx channels. For example, the processor 220 may generate, from radar data, a radar vector of dimensions corresponding to the number of the Rx channels of the radar sensor 210. In this example, in an example of a radar sensor including four Rx channels, the processor 220 may generate a four-dimensional radar vector including a phase value corresponding to each of the Rx channels. The phase value corresponding to each Rx channel may be a numerical value indicating a phase difference.

In another example, when the radar sensor 210 includes one transmitting channel (Tx channel) and four Rx channels, a radar signal radiated through the Tx channel is reflected from a target point, and then reflected radar signals from the target point are received at different angles through the four Rx channels of the radar sensor 210. The radar sensor 210 generates a radar vector including a phase value of each of the four Rx channels. The processor 220 may identify, from a plurality of candidate steering vectors, a target steering vector having a phase value that is most similar to phase information of a radar vector, and may determine a receiving direction indicated by the identified target steering vector to be DoA information.

As described above, the processor 220 may determine a direction in which a sensed target point is present from the radar data processing device 200 based on the steering information.

Figure 3:
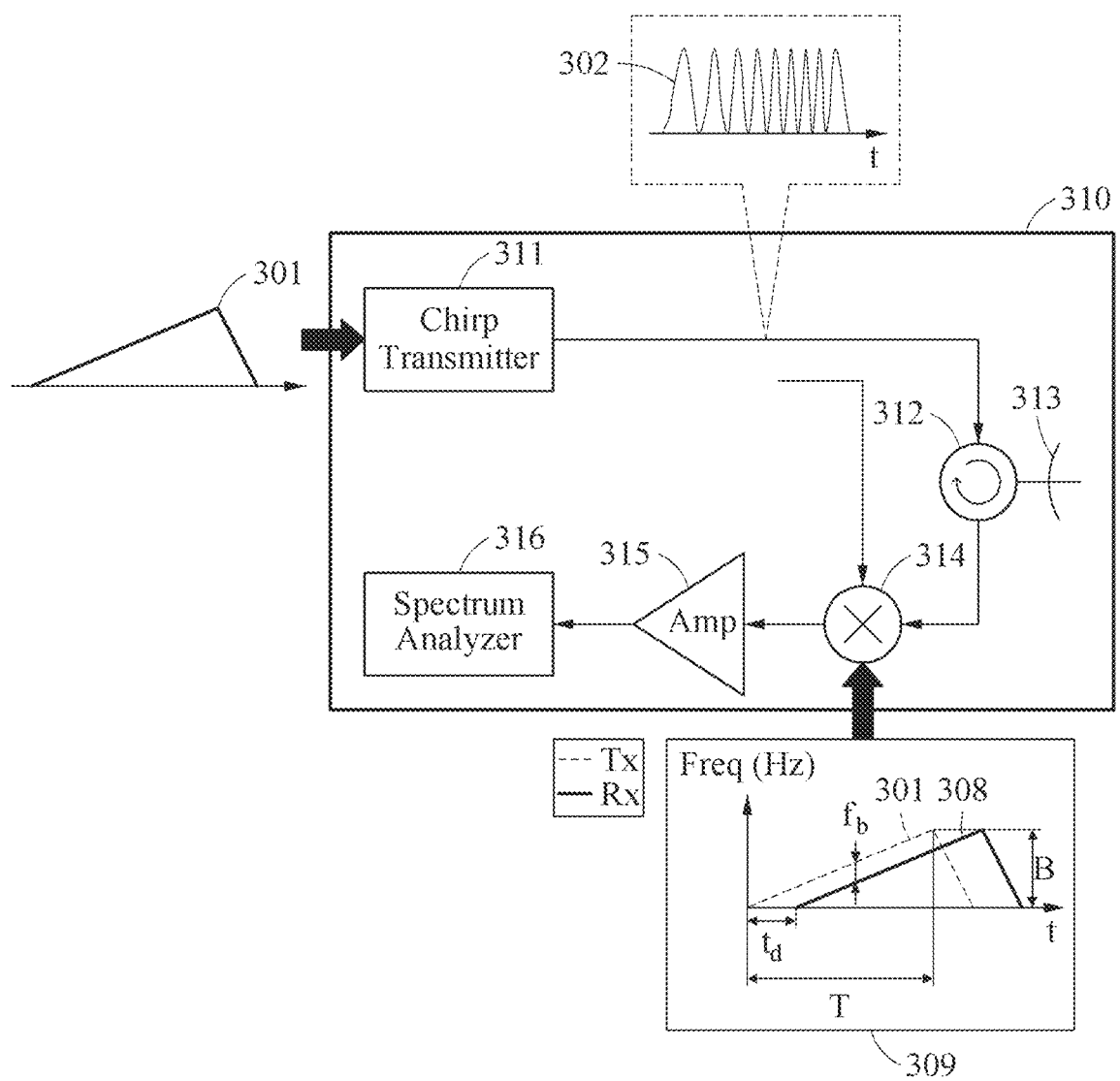
FIG. 3 is a diagram illustrating an example of a radar sensor, in accordance with one or more embodiments.

FIG. 3 is a diagram illustrating an example of a radar sensor in accordance with one or more embodiments.

Referring to FIG. 3, a radar sensor 310 radiates a signal through an antenna 313 and receives a signal through the antenna 313. The radar sensor 310 may be, for example, a mmWave radar, and may measure a distance to an object by analyzing a time of flight (ToF), which is an amount of time that has elapsed for a radiated electric wave to return after striking on the object, and analyzing a change in signal waveform. Compared to an optical sensor such as a camera, the mmWave radar may monitor a front side, or detect an object in a front side, irrespective of a change in external environment, for example, the presence of fog and rain. Additionally, the mmWave radar may have desirable performance for costs compared to a LIDAR, and may thus be a type of sensor that may compensate for flaws of a camera. The radar sensor 310 may be embodied as, for example, a frequency-modulated continuous-wave (FMCW) radar. The FMCW radar may be robust against external noise.

A chirp transmitter 311 of the radar sensor 310 may generate a frequency-modulated (FM) signal 302 of which a frequency changes over time. For example, the chirp transmitter 311 may generate the FM signal 302 by performing frequency modulation on a chirp signal 301. The chirp signal 301 may indicates a signal of which an amplitude increases or decreases linearly over time. The chirp transmitter 311 may generate the FM signal 302 having a frequency corresponding to an amplitude of the chirp signal 301. For example, as illustrated in FIG. 3, the FM signal 302 has a waveform of which a frequency increases gradually in an interval in which an amplitude of the chirp signal 301 increases, and a waveform of which a frequency decreases gradually in an interval in which an amplitude of the chirp signal 301 decreases. The chirp transmitter 311 transmits the FM signal 302 to a duplexer 312.

The duplexer 312 of the radar sensor 310 may determine a transmission path (indicated by Tx in FIG. 3) and a reception path (indicated by Rx in FIG. 3) for a signal through the antenna 313. For example, while the radar sensor 310 is radiating the FM signal 302, the duplexer 312 may form a signal path from the chirp transmitter 311 to the antenna 313, and transmit the FM signal 302 to the antenna 313 through the formed signal path and then radiate it to an outside source.

While the radar sensor 310 is receiving a signal reflected from an object, the duplexer 312 may form a signal path from the antenna 313 to a spectrum analyzer 316. The antenna 313 may receive a reflected signal that is returned from an external object or obstacle after a radiated signal arrives at the external object or the obstacle and is then reflected, and the radar sensor 310 may transmit the reflected signal to the spectrum analyzer 316 through the signal path formed from the antenna 313 to the spectrum analyzer 316.

A frequency mixer 314 may demodulate a linear signal prior to the frequency modulation, for example, an original chirp signal, from a received signal. An amplifier 315 may amplify an amplitude of the demodulated linear signal.

The spectrum analyzer 316 compares the radiated chirp signal 301 and a signal 308 that returns after being reflected from an object. The spectrum analyzer 316 detects a frequency difference between the radiated chirp signal 301 and the reflected signal 308.

Referring to a graph 309 illustrated in FIG. 3, the frequency difference between the radiated chirp signal 301 and the reflected signal 308 may be constant during an interval in which an amplitude of the radiated chirp signal 301 increases linearly along a time axis, and may be proportional to a range between the radar sensor 310 and the object. Thus, the range between the radar sensor 310 and the object may be derived from the frequency difference between the radiated chirp signal 301 and the reflected signal 308. The spectrum analyzer 316 may transmit, to a processor of a radar data processing device, information obtained by such analyzing.

For example, the spectrum analyzer 316 may calculate a range between the radar sensor 310 and an object as represented by Equation 3.

$$R = \frac{cTf_b}{2B} \qquad \text{Equation 3}$$

In Equation 3, R denotes the range between the radar sensor 310 and the object, and c denotes a velocity of light. T denotes a time length in an ascending interval of the radiated chirp signal 301. $f_b$ denotes a frequency difference between the radiated chirp signal 301 and the reflected signal 308 at a point in time in the ascending interval, and is also referred to as a beat frequency. B denotes a modulation bandwidth. The beat frequency $f_b$ may be derived as represented by Equation 4 below.

$$f_b = \frac{t_d B}{T} \qquad \text{Equation 4}$$

In Equation 4, $f_b$ denotes the beat frequency. $t_d$ denotes a time difference, for example, a delay time, between a point in time at which the chirp signal 301 is radiated and a point in time at which the reflected signal 308 is received.

In an example, a plurality of radar sensors may be provided in a plurality of portions of a vehicle, and the radar data processing device, configured to process radar data based on information sensed by the radar sensors, may calculate a distance or range to a target point, a direction, and a relative velocity in all directions of the vehicle. In an example, the radar data processing device may be provided in the vehicle. In an example, the radar processing device may be provided in a mobile device provided in the vehicle. The vehicle, or the mobile device, may then provide various functions for travelling, for example, ACC, BSD, lane change assistance (LCA), and the like, based on information obtained with information collected by the radar sensors.

In this example, each of the radar sensors may perform frequency modulation on a chirp signal and radiate the FM signal to an outside source, and receive a signal reflected from a target point. The processor of the radar data processing device may determine a distance or range from each of the radar sensors to the target point based on a frequency difference between the radiated chirp signal and the received signal.

Figure 4:
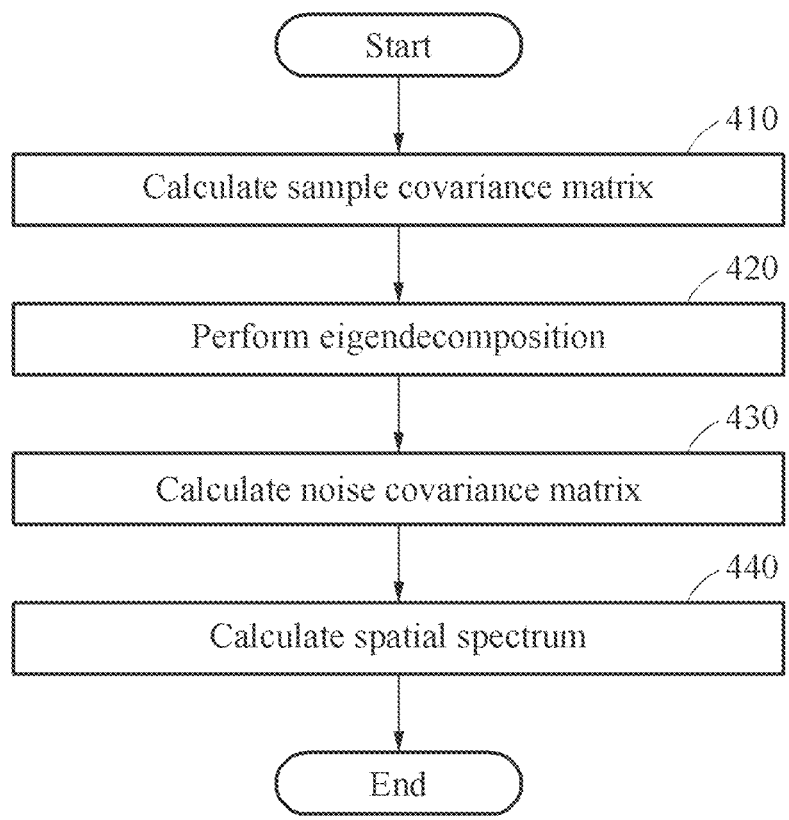
FIG. 4 is a flowchart illustrating an example of a method of processing direction-of-arrival (DoA) information, in accordance with one or more embodiments.

FIG. 4 is a flowchart illustrating an example of a method of processing DoA information in accordance with one or more embodiments. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

In an example, a radar data processing device may process DoA information by applying a multiple signal classification (MUSIC) algorithm to radar data.

Referring to FIG. 4, in operation 410, the radar data processing device calculates a sample covariance matrix. For example, the radar data processing device may calculate a sample covariance matrix from a result of sampling radar signals received by individual Rx channels of a radar sensor.

In operation 420, the radar data processing device performs eigendecomposition. For example, the radar data processing device may obtain eigenvalues and eigenvectors by performing eigendecomposition on the sample covariance matrix.

In operation 430, the radar data processing device calculates a noise covariance matrix. For example, the radar data processing device divides the sample covariance matrix into a signal component and a noise component.

In operation 440, the radar data processing device calculates a spatial spectrum. The radar data processing device forms the spatial spectrum with the noise covariance matrix, and obtains DoA information by discovering a peak.

In an example, a resolving power of a surrounding map and an algorithm processing time used to obtain DoA information are in inverse proportion to each other. In this example, as a value of the resolving power decreases and the resolving power is thus improved, a most amount of time used to calculate the DoA information may be occupied by operation 440 of calculating the spatial spectrum. In an operation of processing a radar image map, calculating the DoA information and operation 440 of calculating the spatial spectrum may require approximately 90% of an entire time used for the process, and thus it may be desirable that an amount of DoA calculation be minimized, or an amount of DoA calculation be prevented from increasing.

However, the MUSIC algorithm is provided merely as an example, and thus other methods or algorithms may be applied to radar data. The other methods or algorithms may include, for example, typical digital beamforming (CDBF), a Bartlett method, a minimum variance distortionless response (MVDR), and similar methods.

Figure 5:
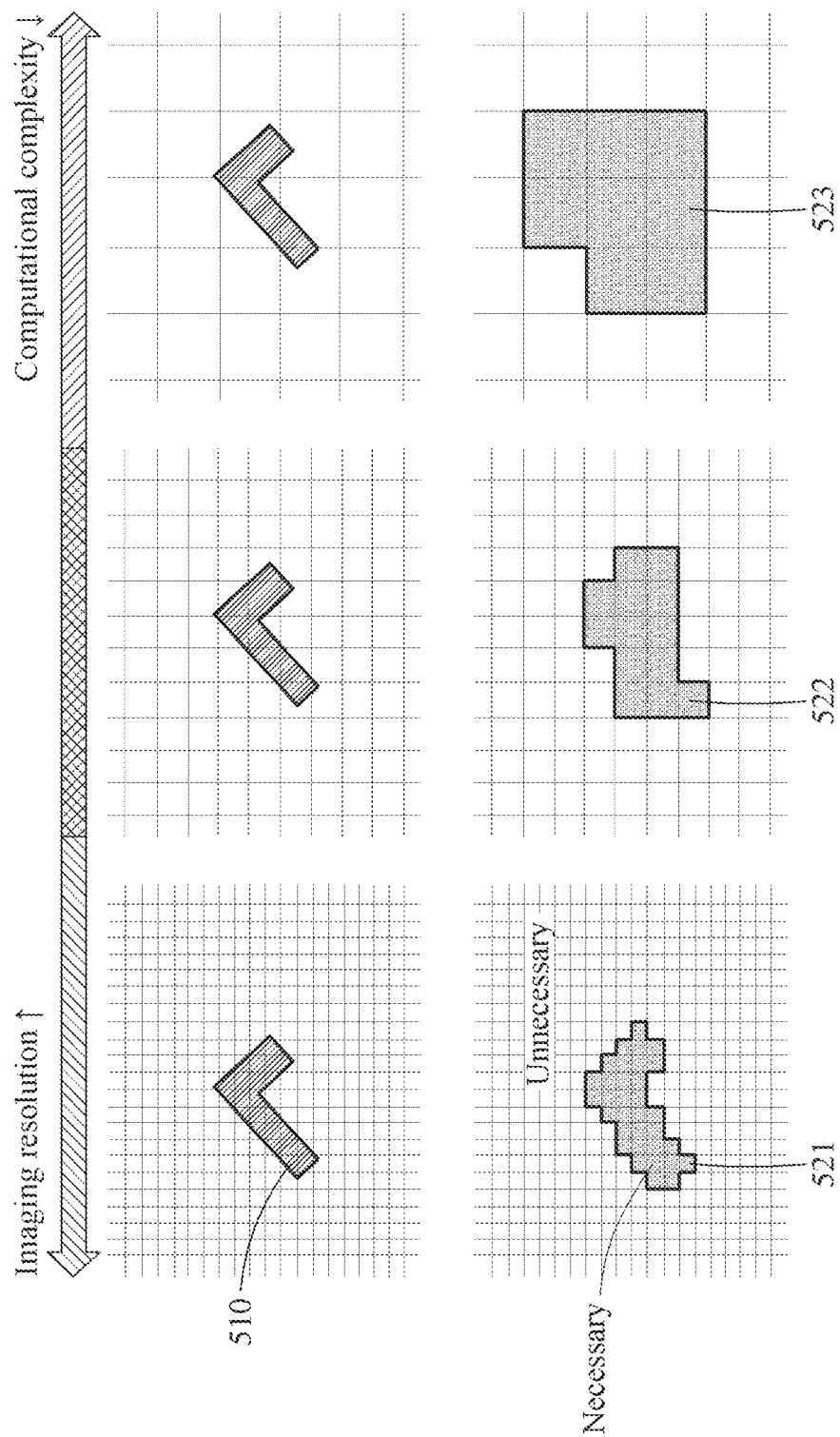
FIG. 5 is a diagram illustrating an example of a resolving power in processing DoA information, in accordance with one or more embodiments.

FIG. 5 is a diagram illustrating an example of a resolving power in processing DoA information in accordance with one or more embodiments.

FIG. 5 illustrates results of sensing an object 510 based on sets of steering information having different resolving powers. Each space in a grid pattern may correspond to a candidate steering vector included in the steering information. For example, when the steering information includes a greater number of candidate steering vectors, a radar data processing device may identify more precisely which direction a radar signal is received, and thus may obtain a sensing result with a more improved resolving power or resolution.

For example, a left portion illustrates target points 521 sensed based on steering information having a fine resolving power. A middle portion illustrates target points 522 sensed based on steering information having an intermediate resolving power. A right portion illustrates target points 523 sensed based on steering information having a poor resolving power. As illustrated, when a resolving power of steering information decreases, a greater number of candidate steering vectors may be densely included, and thus a more accurate image may be obtained. However, a computational complexity may also increase. In contrast, when a resolving power of steering information increases, a smaller number of candidate steering vectors may be sparsely included, and thus a less accurate image may be obtained. However, a computational complexity may decrease.

In an example, the radar data processing device may perform a method having a reduced computational complexity while detecting the object 510 with a fine resolving power for an important region. Hereinafter, a manner in which the radar data processing device obtains, with a low computational complexity, an image having an improved resolving power or resolution based on steering information in which candidate steering vectors are focused on an ROI in which an object is predicted to be present will be described with reference to FIGS. 6 through 13.

Figure 6:
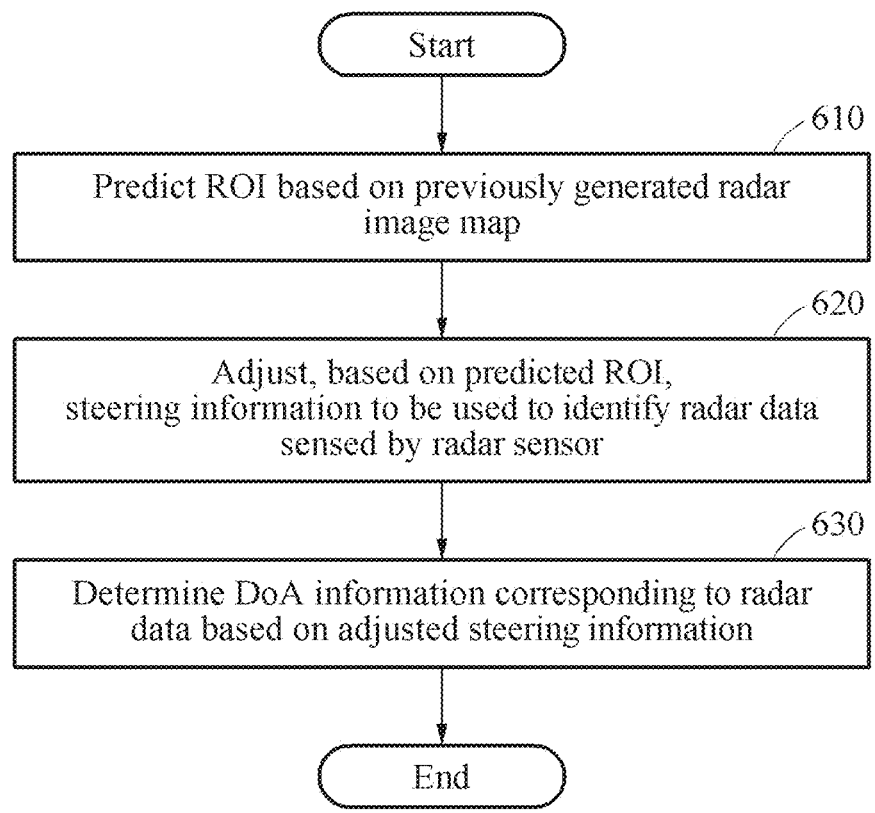
FIG. 6 is a flowchart illustrating an example of a radar data processing method, in accordance with one or more embodiments.

FIG. 6 is a flowchart illustrating an example of a radar data processing method in accordance with one or more embodiments. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, in operation 610, a radar data processing device predicts an ROI based on a previously generated radar image map. For example, predicting an angular ROI will be described in detail with reference to FIG. 8.

In operation 620, the radar data processing device adjusts, based on the predicted ROI, steering information to be used to identify radar data sensed by a radar sensor. The adjusting of the steering information will be described in detail with reference to FIGS. 9 through 11.

In operation 630, the radar data processing device determines DoA information corresponding to the radar data based on the adjusted steering information.

The steering information may include a set of candidate steering vectors that is preset and stored along with locally adjusted resolving power information, and each of the candidate steering vectors may be mapped to an eigenvalue one-to-one. For example, when the prestored candidate steering vectors have phase information and an eigenvalue mapped to each of the candidate steering vectors is a steering angle, the radar data processing device determines a target steering vector corresponding to a radar vector of received radar data among the prestored candidate steering vectors. The radar data processing device outputs a steering angle mapped to the determined target steering vector.

The determining of the target steering vector may include, for example, determining, to be the target steering vector, a candidate steering vector having a smallest difference from the radar vector, for example, a steering vector having a smallest Euclidean distance from the radar vector, among the prestored candidate steering vectors. Alternatively, the determining of the target steering vector may include determining, to be the target steering vector, a candidate steering vector having a most similar parameter to a specific parameter among various parameters included in the radar vector. How the target steering vector is determined is not limited to what has been described in the foregoing, and thus the target steering vector may be determined through various methods.

In an example, the radar data processing device may determine, to be the DoA information corresponding to the radar data, the steering angle mapped to the determined target steering vector.

As the number of candidate steering vectors for an ROI increases in the steering information, a steering angle indicated by each of the candidate steering vectors may be subdivided, and thus the radar data processing device may determine DoA information by a unit of more improved angular resolving power and range resolving power for the ROI.

In an example, the radar data processing device may prevent performance degradation that may be caused by an error in self-estimation of a speed and inaccuracy in estimation of a Doppler velocity, through the radar data processing method described above with reference to FIG. 6. For example, although a self-estimated speed and a Doppler velocity of a nearby object include an error, the radar data processing device may minimize an influence of such error by predicting an ROI based on a radar image map and adjusting steering information, and thus relatively accurately update the radar image map of a nearby environment. In addition, the radar data processing device may generate an accurate radar image map even in a case of a high-speed movement in a relatively low data transmission bandwidth between a radar sensor and a processor in relation to a data acquisition period in which data is obtain from the radar sensor. This is because only a local resolving power is adjusted and an overall resolving power is the same, and thus a processing time used to process radar data may not increase, and also the resolving power may increase locally for an ROI in which a main object and the like is present.

Figure 7:
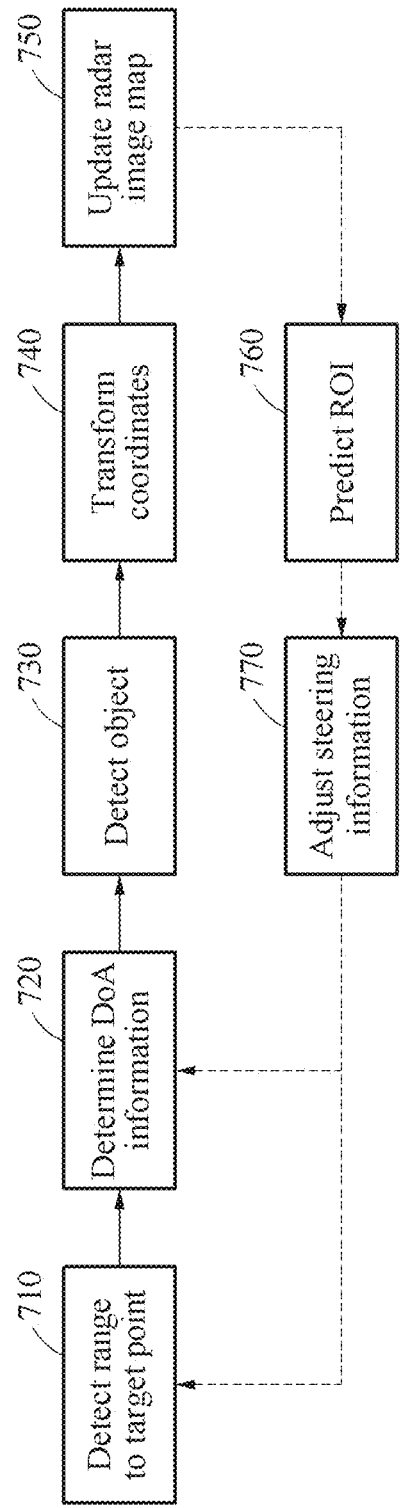
FIG. 7 is a diagram illustrating an example of a radar data processing method, in accordance with one or more embodiments.

FIG. 7 is a diagram illustrating an example of a radar data processing method in accordance with one or more embodiments. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

Referring to FIG. 7, in operation 710, a radar data processing device detects a range to a target point. For example, the radar data processing device processes a radar signal reflected from a target point, and identifies a range to the target point from which the radar signal is reflected.

In operation 720, the radar data processing device determines DoA information. For example, the radar data processing device identifies radar data of each target point based on steering information adjusted for a current frame in operation 770. The radar data processing device identifies a target steering vector matching the radar data from steering information including a candidate steering vector focused on an ROI. The radar data processing device determines, to be DoA information of the radar data, a steering angle corresponding to the target steering vector identified in each target range. For example, the radar data processing device estimates the DoA information using, for example, a MUSIC algorithm, a Bartlett algorithm, a MVDR algorithm, estimation of signal parameters via rotational invariance techniques (ESPRIT), and similar algorithms.

In operation 730, the radar data processing device detects a potential object. For example, the radar data processing device selects a target point corresponding to the potential object from target points from which DoA information is estimated, and applies the selected target point to update a radar image map. The target point corresponding to the potential object may be a point that is potentially predicted to be an object. For example, the radar data processing device selects a target point within a field of view (FOV) of a radar sensor. The radar data processing device excludes a target point out of the FOV from the updating of the radar image map performed in operation 750. For another example, when two target points have similar DoA information with a similarity therebetween, the radar data processing device selects one between the two and excludes the other one from the two. This is because, when the two target points have the same or extremely similar DoA information, the two target points may be substantially the same points. Accordingly, using the same target points to generate a map may not contribute to improving a resolving power, but may increase an operation or computation load. For example, the radar data processing device may use constant false alarm rate (CFAR) detection to detect a potential object.

In operation 740, the radar data processing device transforms coordinates of the target points. In an example, the radar data processing device generates coordinate information of a nearby object based on DoA information and ego-localization of the radar data processing device. For example, target points detected as a potential object in operation 730 may have relative coordinates defined by a range axis and a DoA axis with respect to the radar sensor. The radar data processing device transforms, into absolute coordinates, the relative coordinates of the target points identified by radar data.

In operation 750, the radar data processing device updates a radar image map. For example, the radar data processing device generates the radar image map from coordinate information of a nearby object that is obtained in operation 740. The radar image map may be a map indicating target points detected around the radar data processing device, for example, indicating absolute coordinates of the target points. The radar image map includes a plurality of spaces, and each of the spaces indicates an object occupancy probability or a radar signal reception intensity.

The object occupancy probability may indicate a probability of an object occupying an absolute coordinate indicated by each space. The radar signal reception intensity indicates an intensity of a signal reflected and received from an absolute coordinate indicated by each space. A map of the radar image map that indicates the object occupancy probability may be referred to as an occupancy grid map (OGM), and a map of the radar image map that indicates the radar signal reception intensity may be referred to as an intensity grid map (IGM). However, types of the radar image map are not limited to the examples described in the foregoing.

In an example, the radar data processing device may generate, as a radar image map for a current frame, a map indicating at least one of the object occupancy probability or the radar signal reception intensity of nearby points of the device from DoA information for the current frame. For example, the radar data processing device may generate a radar scan image of the radar sensor based on the DoA information. The radar data processing device generates the radar image map of a nearby environment or situation of the radar data processing device, based on a radar scan image generated from each of a plurality of radar sensors.

Additionally, in operation 760, the radar data processing device predicts an ROI for a current frame based on information of up to a previous frame. For example, the radar data processing device may set an ROI in the current frame such that the ROI includes a region in which an object is detected in the previous frame. This is because, when the object is present in the previous frame, it is likely that the object is present in the current frame.

For example, the radar data processing device may calculate DoA information corresponding to the previous frame from radar data collected in operation 720 for the previous frame. In operation 740 for the previous frame, the radar data processing device may generate coordinate information of a nearby object corresponding to the previous frame based on the DoA information corresponding to the previous frame and ego-localization of the radar data processing device. The radar data processing device calculates the coordinate information of the nearby object corresponding to the previous frame in operation 740 for the previous frame, and updates the radar image map of up to the previous frame from the coordinate information of the nearby object corresponding to the previous frame in operation 750 for the previous frame. The radar data processing device predicts the ROI of the current frame based on the radar image map of up to the previous frame in operation 760 for the current frame.

In operation 770, the radar data processing device adjusts steering information. In an example, the radar data processing device performs an ROI focusing operation. For example, the radar data processing device decreases locally a radar data processing resolving power by focusing on the predicted ROI. Examples of adjusting steering information based on an ROI may include adjusting an angular resolving power which will be described with reference to FIG. 9, adjusting a range resolving power which will be described with reference to FIG. 10, and adjusting a Doppler velocity resolving power which will be described with reference to FIG. 11.

Figure 8:
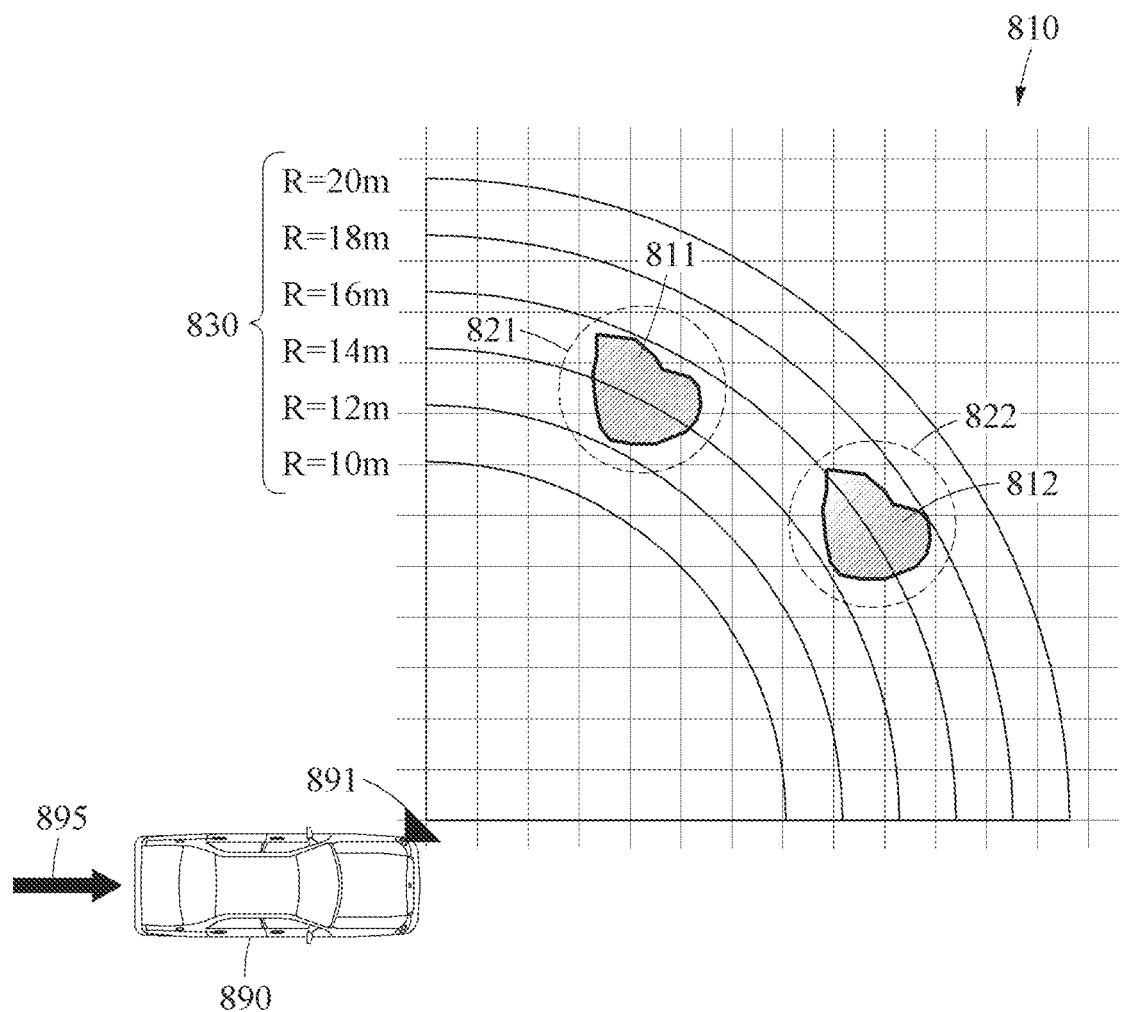
FIG. 8 is a diagram illustrating an example of predicting a region of interest (ROI), in accordance with one or more embodiments.

FIG. 8 is a diagram illustrating an example of prediction of an ROI in accordance with one or more embodiments.

In an example, a radar data processing device generates or updates a radar image map 810 of up to a previous frame as described above with reference to FIG. 7. The radar image map 810 is illustrated in FIG. 8 as a map of a grid pattern including a plurality of spaces indicating an object occupancy probability or a signal reception intensity. However, the radar image map 810 is not limited to the illustrated example map, and may be generated as a type of point clouds. The radar data processing device detects an object from the radar image map 810. For example, as illustrated, the radar data processing device detects a first object 811 and a second object 812. The radar data processing device predicts an ROI including a region occupied by the detected object. For example, as illustrated, the radar data processing device detects a first ROI 821 and a second ROI 822.

For example, a radar sensor 891 is provided with an FOV different in direction from a longitudinal direction of a vehicle 890. Although the FOV in FIG. 8 is illustrated as covering an area which is in a direction that extends approximately 90° from the vehicle 890, this is only an example, and the FOV may be greater that the area illustrated in FIG. 8. Additionally, to maximize an amount of information to be obtained by the radar sensor 891, the radar sensor 891 may o be arranged differently in angle from a traveling direction 895 of the radar data processing device, for example, the vehicle 890. In the example of FIG. 8, the radar sensor 891 is arranged to view an oblique line relative to the traveling direction 895 of the vehicle 890, and the radar image map 810 is generated to cover the FOV of the radar sensor 891.

The radar data processing device divides a maximum sensing range of the radar sensor 891 into a plurality of ranges 830, and calculates DoA information for each of the ranges 830. The ranges 830 may be divided by an interval of 2 meters (m), which is a unit of range resolving power, and may include distances of 10 m, 12 m, 14 m, 16 m, 18 m, and 20 m from the radar sensor 891. However, this is only an example, and the target ranges may be divided by intervals other than 2 m. The calculating of the DoA information for each of the ranges 830 will be described in detail with reference to FIG. 9.

Figure 9:
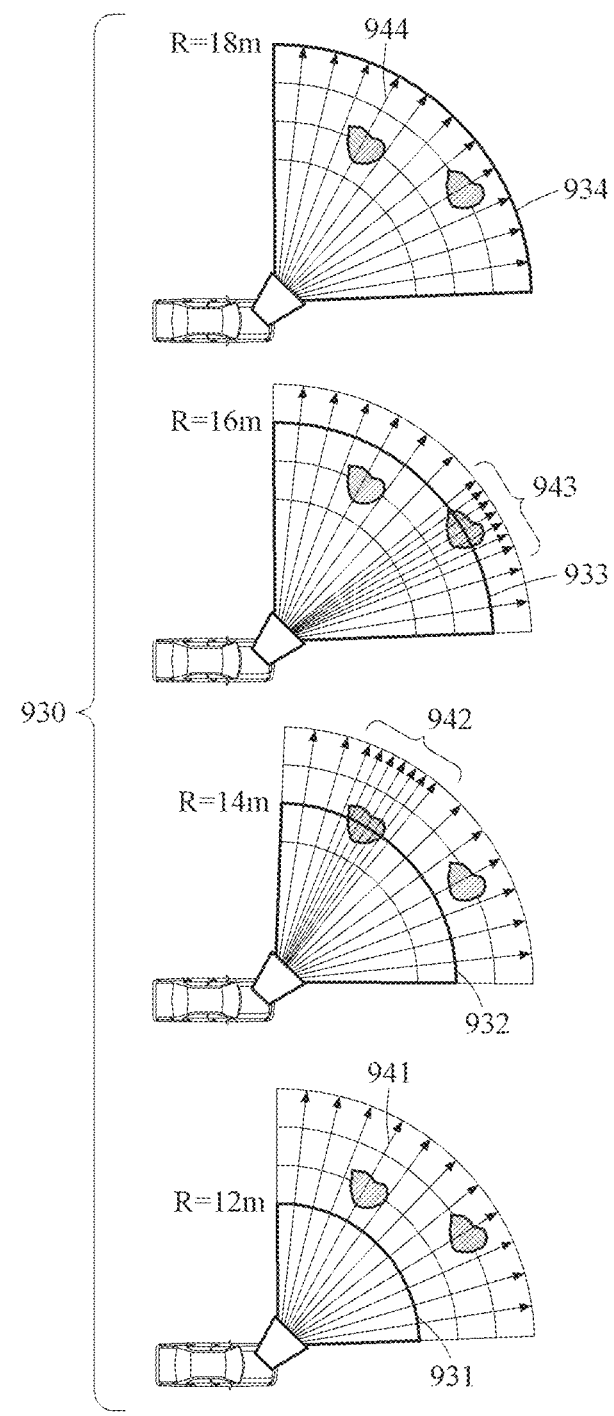
FIG. 9 is a diagram illustrating an example of allocating a steering vector to each of ranges in steering information, in accordance with one or more embodiments.

FIG. 9 is a diagram illustrating an example of allocating a steering vector to each of ranges in steering information in accordance with one or more embodiments.

In an example, a radar data processing device allocates a preset number of candidate steering vectors included in steering information to each of one or more target ranges based on an ROI. For example, as illustrated in FIG. 9, the radar data processing device selects target ranges to be subject to DoA calculation with a same range resolving power, for example, 2 m, and allocates a same number of candidate steering vectors to each of the selected target ranges. In each of the target ranges, the candidate steering vectors may be arranged based on a same angular resolving power, or arranged based on an angular resolving power that is locally adjusted based on the ROI.

For example, the radar data processing device arranges candidate steering vectors in the ROI intensively by adjusting a distribution of candidate steering vectors for each of the target ranges in the steering information. The radar data processing device increases the number of candidate steering vectors for the ROI in the steering information. In addition, the radar data processing device decreases the number of candidate steering vectors for a remaining region excluding the ROI in the steering information.

In the example of FIG. 9, target ranges 930 are 12 m, 14 m, 16 m, and 18 m. Based on a radar image map of up to a previous frame, an object is present in a range 932 of 14 m and a range 933 of 16 m. Thus, the radar data processing device predicts ROIs such that the ROIs include the range 932 (R=14 m) and the range 933 (R=16 m). The radar data processing device allocates candidate steering vectors intensively to an angular range, for example, angular ranges 942 and 943, corresponding to an ROI in each target range, and allocates a smaller number of candidate steering vectors to the remaining region or regions.

For example, in the example of FIG. 9, a local angular resolving power of candidate steering vectors arranged in a first angular range 942 corresponding to a first ROI in a first target range (R=14 m) and a second angular range 943 corresponding to a second ROI in a second target range (R=16 m) may be finer than a local angular resolving power of candidate steering vectors arranged in a remaining angular range. In addition, the numbers of candidate steering vectors to be allocated to target ranges may be the same, and only a resolving power of a region may be locally adjusted with an overall resolving power not being changed.

In the example of FIG. 9, a candidate steering vector consists of a vector described above with reference to Equation 2 based on a steering angle corresponding to an arrow-indicating direction in FIG. 9.

In addition, when a new potential object is detected in a range in which the object is not detected in a previous frame, the radar data processing device allocates a candidate steering vector to the range in which the new potential object is detected with a basic angular resolving power in the steering information. In the example of FIG. 9, an object is not detected in a range 931 of 12 m and a range 934 of 18 m in the previous frame, and the ranges 931 and 934 may be a remaining region excluding an ROI. Thus, the radar data processing device equally allocates candidate steering vectors 941 and 944 to such target ranges 931 and 934 with the basic angular resolving power.

When the adjusting of the steering information is completed, the radar data processing device retrieves, from the steering information, a target steering vector matching sensed radar data among candidate steering vectors for each of target ranges within a maximum sensing range of a radar sensor. The radar data processing device determines, to be DoA information corresponding to the radar data, a steering angle mapped to the retrieved target steering vector.

However, the radar data processing device may not necessarily determine DoA information for all the target ranges. For example, the radar data processing device may skip determining DoA information for a target range in which an object is not detected in a current frame among all the target ranges subject to DoA calculation in the adjusted steering information.

In addition, when an object is not detected in a radar image map of a previous frame, the radar data processing device may select ranges with a basic resolving power from steering information, and arrange candidate steering vectors in the selected ranges. Thus, when the object is not detected in the radar image map of the previous frame, the radar data processing device may include candidate steering vectors in the steering information with a basic range resolving power and a basic angular resolving power.

Figure 10:
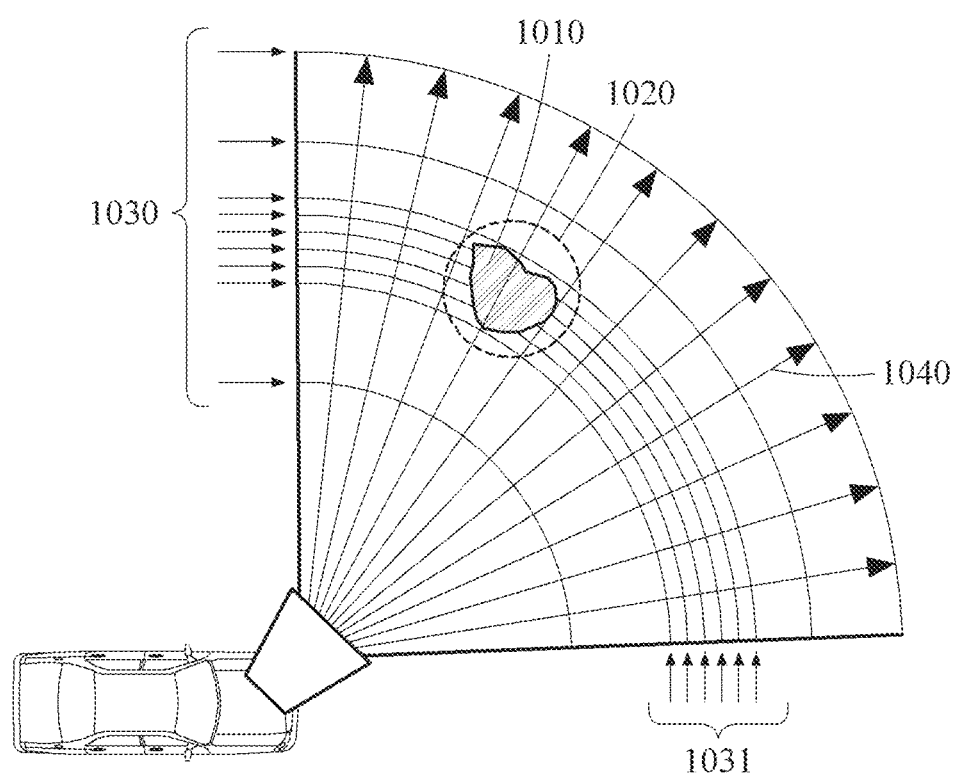
FIG. 10 is a diagram illustrating an example of locally adjusting a range resolving power of ranges in steering information, in accordance with one or more embodiments.

FIG. 10 is a diagram illustrating an example of locally adjusting a range resolving power of ranges in steering information in accordance with one or more embodiments.

In an example, a radar data processing device selects a plurality of target ranges to be subject to DoA calculation within a maximum sensing range of a radar sensor based on an ROI 1020. For example, the radar data processing device adjusts a distribution of the target ranges, and arranges candidate steering vectors 1040 in the ROI 1020 intensively. The radar data processing device increases the number of target ranges to be subject to the DoA calculation for a scope, or an area, in steering information corresponding to the ROI 1020, and decreases the number of target ranges to be subject to the DoA calculation for a scope in the steering information corresponding to a remaining region excluding the ROI 1020.

For example, as illustrated in FIG. 10, when the radar data processing device selects target ranges 1030 from which a DoA is to be calculated, the radar data processing device intensively selects ranges 1031 corresponding to the ROI 1020. Thus, the number of ranges corresponding to the remaining region or regions decreases, and the number of the ranges 1031 corresponding to the ROI 1020 increases. As described above, the ROI 1020 is predicted such that it includes a region in which an object 1010 is detected from a previous radar image map.

Subsequently, the radar data processing device allocates the candidate steering vectors 1040, the number of which is preset, to each selected target range in the steering information, based on the ROI 1020.

Figure 11:
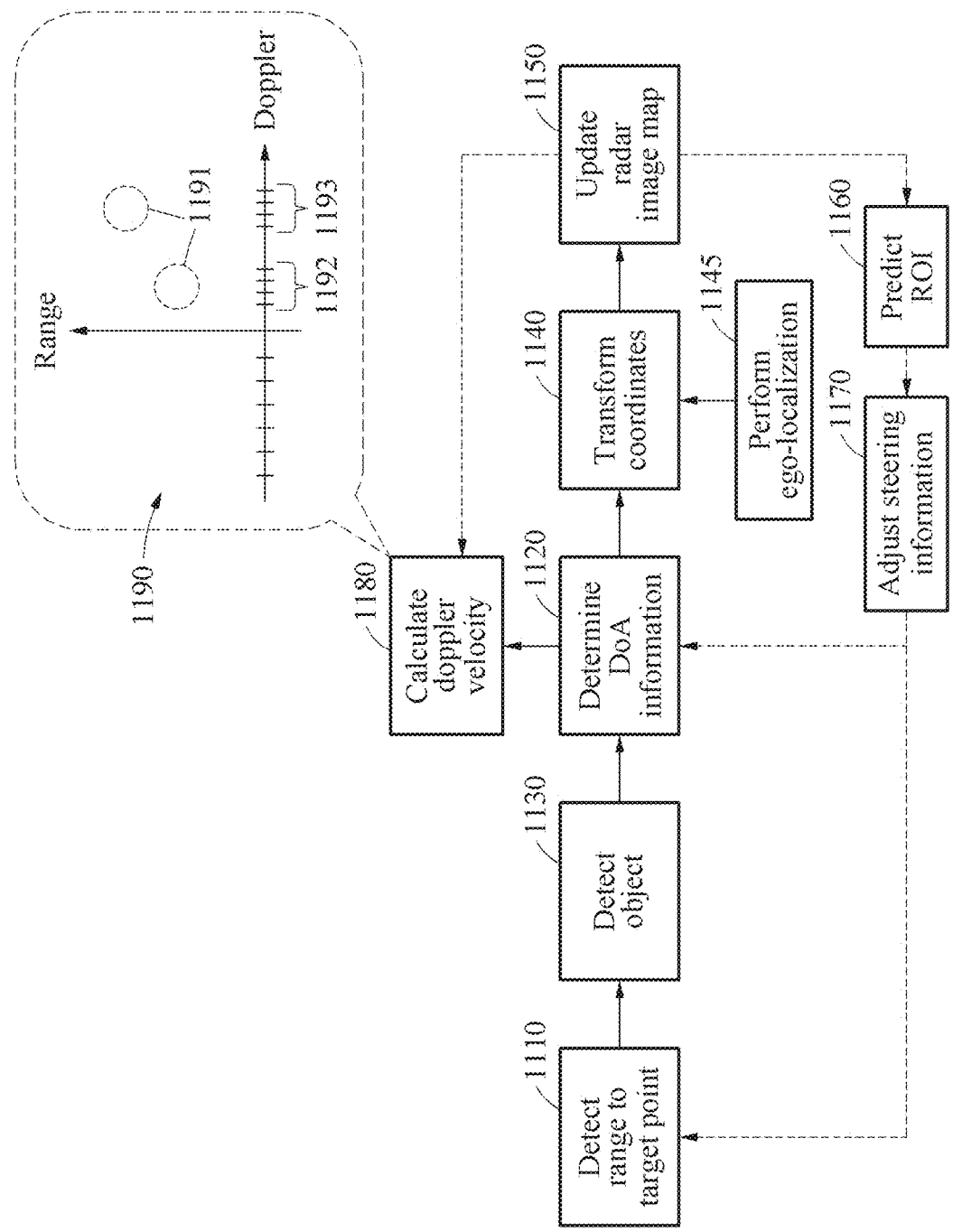
FIG. 11 is a diagram illustrating an example of calculating a Doppler velocity, in accordance with one or more embodiments.

FIG. 11 is a diagram illustrating an example of calculating a Doppler velocity in accordance with one or more embodiments.

Operations 1110, 1120, 1140, 1150, 1160, and 1170 to be described hereinafter with reference to FIG. 11 may be similar to operations 710, 720, 740, 750, 760, and 770 described above with reference to FIG. 7. However, operation 730 of detecting an object is performed prior to operation 720 of determining DoA information in the example of FIG. 7, but examples are not limited thereto. As in the example of FIG. 11, operation 1130 of detecting an object may be performed subsequent to operation 1120 of determining DoA information. Based on whether such an object detecting operation is performed before or after such a DoA information determining operation, a data format of a result of the object detecting operation to be reflected in the DoA information determining operation, and a data format of a result of the object detecting operation to be reflected in a coordinate transformation may change. In addition, in operation 1145, a radar data processing device performs ego-localization, and determines absolute coordinates of a current location of the radar data processing device. In operation 1140, the radar data processing device transforms coordinates of potential objects based on a result of the ego-localization performed in operation 1145.

In an example, a radar image map updated in operation 1150 may be used to calculate a Doppler velocity. For example, in operation 1180, the radar data processing device calculates Doppler velocity information based on DoA information. In this example, the radar data processing device adjusts a local resolving power of the Doppler velocity information based on an ROI predicted based on the radar image map. For example, a Doppler map 1190 is a map indicating Doppler information, for example, a Doppler velocity, of target points sensed by a radar sensor. In the Doppler map 1190, a horizontal axis indicates a Doppler value, and a vertical axis indicates a range to a target point. The Doppler value is a Doppler velocity, and indicates a relative velocity of the target point relative to the radar sensor, for example, a difference between a velocity of the target point and a velocity of the radar sensor. The Doppler map 1190 may be generated based on a frequency difference between a signal radiated by the radar sensor and a reflected signal. However, a format of a Doppler map is not limited to the example described in the foregoing, and may change based on a design.

The radar data processing device locally adjusts a Doppler velocity resolving power as illustrated in FIG. 11 such that the Doppler velocity resolving power decreases in Doppler ranges 1192 and 1193 corresponding to an ROI 1191, and increases in remaining ranges, on the Doppler axis. Thus, the radar data processing device determines a Doppler velocity by a finer unit for the Doppler ranges 1192 and 1193 corresponding to the ROI 1191.

Figure 12:
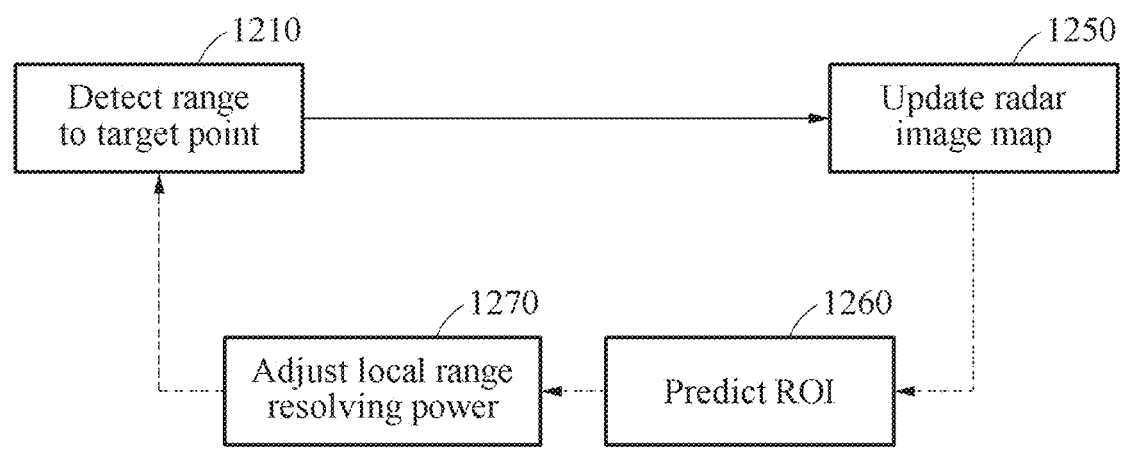
FIG. 12 is a diagram illustrating an example of adjusting a local range resolving power based on a result of predicting an ROI, in accordance with one or more embodiments.

FIG. 12 is a diagram illustrating an example of adjusting a local range resolving power based on a result of predicting an ROI in accordance with one or more embodiments.

Referring to FIG. 12, in operation 1260, a radar data processing device predicts an ROI based on a previously generated radar image map.

In operation 1270, the radar data processing device adjusts a local range resolving power for a radar data sensed by a radar sensor, based on the predicted ROI. For example, similarly to what has been described with reference to FIG. 10, the radar data processing device performs range processing on a range scope (or distance range) corresponding to the ROI in a first dimension, and performs range processing on a range scope corresponding to a remaining region in a second dimension lower than the first dimension. For example, the radar data processing device may consistently maintain an overall range resolving power in range detection, and thus maintain processing performance.

In operation 1210, the radar data processing device detects a range to a target point from which radar data is reflected, based on the adjusted local range resolving power. For example, for radar data reflected from a target point corresponding to the ROI, the radar data processing device detects a range to the target point by a unit of decreased range resolving power. Additionally, for radar data reflected from a target point corresponding to a remaining region, the radar data processing device detects a range to the target point by a unit of increased range resolving power. Thus, the radar data processing device generates a more precise range measurement result for the ROI than for the remaining region, based on the local range resolving power that is adjusted in operation 1270.

Subsequently, in operation 1250, the radar data processing device calculates various sets of radar related information, for example, DoA information and coordinates of target points, based on the detected range to the target point, and updates a radar image map based on the calculated radar related information. The radar image map may be generated or updated as described above with reference to FIGS. 1 through 11, but not limited thereto.

The operations described above with reference to FIG. 12 may be performed along with at least one of the operations described above with reference to FIGS. 1 through 11 in time-series manner or in parallel.

Figure 13:
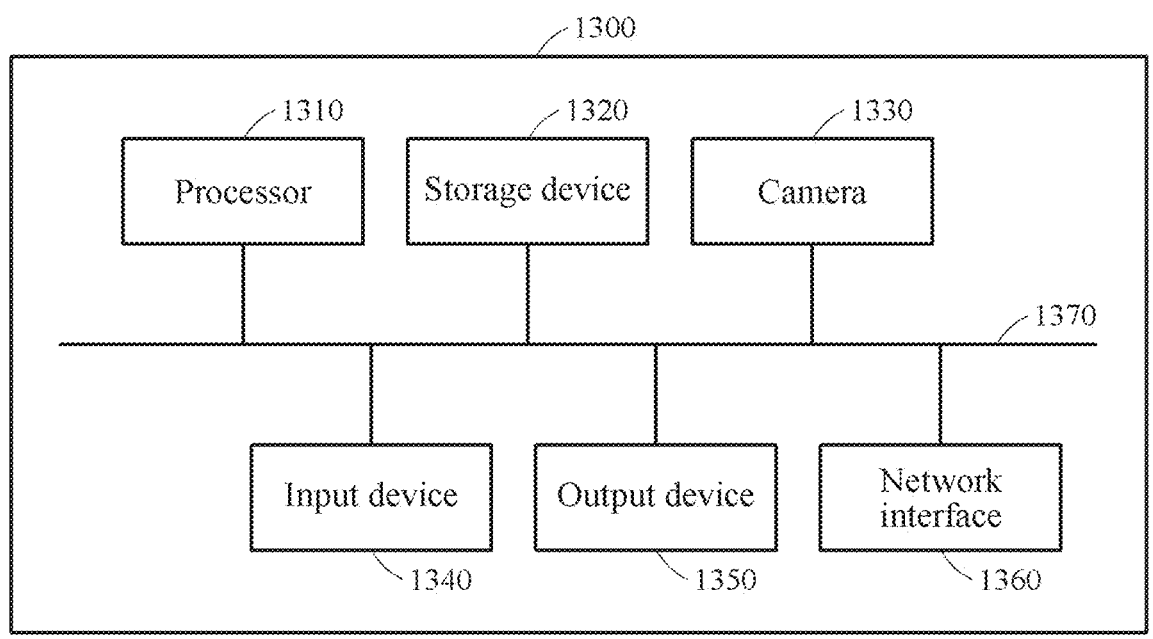
FIG. 13 is a diagram illustrating another example of a radar data processing device, in accordance with one or more embodiments.

FIG. 13 is a diagram illustrating another example of a radar data processing device in accordance with one or more embodiments.

In the example of FIG. 13, a computing device 1300 may be a radar data processing device configured to process radar data with a radar data processing method described above. In an example, the computing device 1300 may be the radar data processing device 200 described above with reference to FIG. 2. The computing device 1300 may be, for example, an image processing device, a smartphone, a wearable device, a tablet computer, a netbook, a laptop, a desktop, a personal digital assistant (PDA), and a head mounted display (HMD).

Referring to FIG. 13, the computing device 1300 may include a processor 1310, a storage device 1320, a camera 1330, an input device 1340, an output device 1350, and a network interface 1360. The processor 1310, the storage device 1320, the camera 1330, the input device 1340, the output device 1350, and the network interface 1360 may communicate with one another through a communication bus 1370.

The processor 1310 may execute functions and instructions in the computing device 1300. For example, the processor 1310 processes instructions stored in the storage device 1320. The processor 1310 may perform one or more of the methods or operations described above with reference to FIGS. 1 through 12.

The storage device 1320 may store information or data required to execute the processor 1310. The storage device 1320 may include a computer-readable storage medium or device. The storage device 1320 may store instructions to be executed by the processor 1310, and relevant information while software or an application is being run by the computing device 1300.

The camera 1330 may capture an image including a plurality of image frames. For example, the camera 1330 may generate a frame image.

The input device 1340 may receive an input from a user, as a non-limiting example, a tactile input, a video input, an audio input, and a touch input. The input device 1340 may detect an input from, as a non-limiting example, a keyboard, a mouse, a touchscreen, a microphone, and a user, and include other devices configured to transfer the detected input.

The output device 1350 may provide a user with an output of the computing device 1300 through a visual, audio, or tactile channel. The output device 1350 may include, as a non-limiting example, a display, a touchscreen, a speaker, a vibration generator, and other devices configured to provide the user with the output. The network interface 1360 may communicate with an external device through a wired or wireless network. In an example, the output device 1350 may provide a user with a result of processing radar data, and the like, using at least one of visual information, auditory information, or haptic information. For example, when the computing device 1300 is provided or mounted in a vehicle, the computing device 1300 may visualize a radar image map through a display. The computing device 1300 may adjust at least one of a speed, an acceleration, or a steering operation of the vehicle based on the radar image map.

The radar data processing device, the radar sensor 210, and processor 220, the radar sensor, 310, the chirp transmitter 311, the spectrum analyzer 316, the amplifier 315, the duplexer 312, the antenna 313, the frequency mixer 314, the processor 1310, the storage device 1320, the camera 1330, the input device 1340, the output device 1350, and the network interface 1360 with respect to FIGS. 1-13, and that perform operations described in this application, are implemented by or representative of hardware components.

Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A radar data processing method comprising:
generating a radar image map by combining radar scan images;
predicting a region of interest (ROI) of a current frame based on previous frame information, where the ROI corresponds to a distance and an angle in which an object is predicted to be present based on the generated radar image map;
adjusting steering information based on the predicted ROI, the steering information comprising a plurality of candidate steering vectors;
sensing radar data with a radar sensor; and
determining direction-of-arrival (DoA) information corresponding to the sensed radar data based on the adjusted steering information, the DoA information being a direction in which a radar signal reflected from a target point is received, and
calculating Doppler velocity information based on the DoA information; and
adjusting a local resolving power of the Doppler velocity information based on the predicted ROI,
wherein each of the candidate steering vectors includes phase information of a radar data received at a predetermined angle.

2. The radar data processing method of claim 1, wherein the adjusting of the steering information comprises:
allocating a preset number of the candidate steering vectors included in the steering information to each of one or more target ranges based on the ROI.

3. The radar data processing method of claim 2, wherein the allocating of the preset number of candidate steering vectors to each of the one or more target ranges based on the ROI comprises:
arranging the candidate steering vectors in the ROI intensively by adjusting a distribution of the candidate steering vectors for each of the one or more target ranges in the steering information.

4. The radar data processing method of claim 2, wherein the allocating of the preset number of candidate steering vectors to each of the one or more target ranges based on the ROI comprises:
increasing a number of the candidate steering vectors associated with the ROI in the steering information; and
decreasing a number of candidate steering vectors associated with a remaining region excluding the ROI in the steering information.

5. The radar data processing method of claim 1, wherein the adjusting of the steering information comprises:
selecting a plurality of target ranges to be subject to calculation of the DoA information within a maximum sensing range of the radar sensor based on the ROI; and
allocating a preset number of candidate steering vectors to each of the selected target ranges in the steering information based on the ROI.

6. The radar data processing method of claim 5, wherein the selecting of the plurality of target ranges based on the ROI comprises:
arranging candidate steering vectors in the ROI intensively by adjusting a distribution of the plurality of target ranges.

7. The radar data processing method of claim 5, wherein the selecting of the plurality of target ranges based on the ROI comprises:
increasing a number of target ranges to be subject to the calculation of the DoA information for an area corresponding to the ROI in the steering information; and
decreasing a number of target ranges to be subject to the calculation of the DoA information for an area corresponding to a remaining region excluding the ROI in the steering information.

8. The radar data processing method of claim 1, wherein the determining of the DoA information comprises:
retrieving, from the steering information, a target steering vector which matches the sensed radar data among candidate steering vectors for each of target ranges within a maximum sensing range of the radar sensor; and
determining a steering angle mapped to the retrieved target steering vector to be the DoA information corresponding to the radar data.

9. The radar data processing method of claim 1, wherein the adjusting of the steering information comprises: when a new potential object is detected in a range in which the object is not detected in a previous frame, allocating a candidate steering vector to the range in which the new potential object is detected with a basic angular resolving power in the steering information.

10. The radar data processing method of claim 1, wherein the determining of the DoA information further comprises:
skipping a determining of DoA information for a target range in which the object is not detected in a current frame among target ranges to be subject to calculation of the DoA information in the adjusted steering information.

11. The radar data processing method of claim 1, wherein the predicting of the ROI comprises:
calculating DoA information corresponding to a previous frame from radar data collected from the previous frame;
generating coordinate information of a nearby object corresponding to the previous frame based on the DoA information corresponding to the previous frame and ego-localization of a radar data processing device; and
predicting an ROI of a current frame based on a radar image map subsequent to the previous frame generated from the coordinate information corresponding to the previous frame.

12. The radar data processing method of claim 1, further comprising:
generating, as a radar image map of a current frame, a map that indicates at least one of an object occupancy probability and a radar signal reception intensity of nearby points around a radar data processing device from DoA information of the current frame.

13. The radar data processing method of claim 12, further comprising:
visualizing the radar image map through a display.

14. The radar data processing method of claim 12, further comprising:
changing, based on the radar image map, at least one of a speed, an acceleration, and a steering operation of a vehicle in which the radar data processing device is mounted.

15. The radar data processing method of claim 1, wherein the method further comprises performing a detection for the object in a radar image map of a previous frame, and wherein the adjusting of the steering information comprises:

when the object is not detected in the radar image map of the previous frame, selecting target ranges from the steering information with a basic resolving power and arranging candidate steering vectors in the selected target ranges.

16. The radar data processing method of claim 1, wherein the radar sensor comprises a field of view (FOV) that includes a different direction from a longitudinal direction of a vehicle.

17. A non-transitory computer-readable storage medium storing instructions that, when executed by one or more processors, cause the one or more processors to perform the radar data processing method of claim 1.

18. A radar data processing method comprising:

generating a radar image map by combining radar scan images;

predicting a region of interest (ROI) of a current frame based on previous frame information, where the ROI corresponds to a distance and an angle in which an object is predicted to be present based on the generated radar image map;

adjusting a local range resolving power of radar data based on the predicted ROI; and detecting a range to a target point from which the radar data is reflected based on the adjusted local range resolving power.

19. The radar data processing method of claim 18, wherein the adjusting of the local range resolving power comprises:

decreasing a range resolving power for the ROI within a maximum sensing range of a radar sensor; and increasing a range resolving power for a remaining region excluding the ROI.

20. The radar data processing method of claim 19, wherein the detecting of the range comprises:

when radar data is reflected from a first target point corresponding to the ROI, detecting a range to the first target point by a unit of the decreased range resolving power; and when radar data is reflected from a second target point corresponding to the remaining region, detecting a range to the second target point by a unit of the increased range resolving power.

21. The radar data processing method of claim 18, wherein the adjusting of the local range resolving power comprises:

consistently maintaining an overall range resolving power in range detection.

22. A radar data processing device comprising:

a radar sensor configured to sense radar data; and a processor configured to:

generate a radar image map by combining radar scan images;

predict a region of interest (ROI) of a current frame based on previous frame information, where the ROI corresponds to a distance and an angle in which an object is predicted to be present based on the generated radar image map;

adjust steering information which identifies the sensed radar data based on the predicted ROI, the steering information comprising a plurality of candidate steering vectors, and determine direction-or-arrival (DoA) information corresponding to the radar data based on the adjusted steering information, the DoA information being a direction in which a radar signal reflected from a target point is received, and calculate Doppler velocity information based on the DoA information; and adjust a local resolving power of the Doppler velocity information based on the predicted ROI, wherein each of the candidate steering vectors includes phase information of a radar data received at a predetermined angle.

\* \* \* \* \*